(12) United States Patent
Bernard (10) Patent No.: US 8,515,614 B2
(45) Date of Patent: ***Aug. 20, 2013

(54) EMISSION MONITORING DEVICE AND METHOD

(76) Inventor: Lee Bernard, Houston, TX (US)

( * ) Notice: Subject to any disclaimer, the term of this patent is extended or adjusted under 35 U.S.C. 154(b) by 455 days.

This patent is subject to a terminal disclaimer.

(21) Appl. No.: 12/724,663

(22) Filed: Mar. 16, 2010

(65) Prior Publication Data

US 2010/0185358 A1 Jul. 22, 2010

Related U.S. Application Data (63) Continuation-in-part of application No. 11/429,844, filed on May 8, 2006, now Pat. No. 7,702,438.

(51) Int. Cl.
*G01M 17/00* (2006.01)

(52) U.S. Cl.
USPC .................................. 701/29.1; 701/31.4

(58) Field of Classification Search
USPC ..... 701/29.1, 31.4, 33.2, 33.5; 702/182–185; 60/272, 276
See application file for complete search history.

(56) References Cited

U.S. PATENT DOCUMENTS

| | | | | |
|---|---|---|---|---|
| 5,539,638 A | * | 7/1996 | Keeler et al. | 701/32.9 |
| 7,069,126 B2 | * | 6/2006 | Bernard | 701/33.2 |
| 7,702,438 B2 | * | 4/2010 | Bernard | 701/33.2 |

\* cited by examiner

*Primary Examiner* — Yonel Beaulieu
(74) *Attorney, Agent, or Firm* — Delphing James (57) ABSTRACT

An emission monitoring device is disclosed for a vehicle including but not limited to a lightweight housing for operationally encapsulating: a processor; a computer program including but not limited to computer readable instructions embedded in a tangible non-transitory computer readable medium; a sensor for each vehicle component to be monitored; a display device; and a power supply for power the device; the computer program including but not limited to instructions to analyze fuel being injected into the vehicle from data output from each sensor; capture data from each sensor; store the captured data from each sensor into the memory; calculate performance attributes based upon the captured data; store the performance attributes; and display the performance attributes of each vehicle component onto the display device. A method is provided for monitoring emissions using the emission monitoring device.

13 Claims, 9 Drawing Sheets

Carbon dioxide and other heat – trapping gases exhaust sensor.

The emission monitoring display device and system is of a capability of measuring and weighing the tailpipe exhaust that is emitted into the atmosphere. A on board total accountability of emissions emitted

EMISSION MONITORING DEVICE AND METHOD

CROSS REFERENCE TO RELATED APPLICATIONS

This patent application is a continuation in part of U.S. patent application Ser. No. 11/429,844 entitled An Emission Monitoring Device by Lee Bernard filed on May 5, 2006, which is hereby incorporated by reference in its entirety, which a continuation in part of U.S. Pat. No. 7,069,126 entitled An Emission Monitoring Device by Lee Bernard, which is also hereby incorporated by reference in its entirety.

BACKGROUND

This invention relates to devices utilized to monitor air quality in the environment. As the population increases, the use of vehicles will increase thereby creating an increase in air pollution. The Environmental Protection Agency (EPA) has emission guidelines for vehicles that must be met in order for a vehicle to be considered safe. This invention provides a tool to monitor vehicle air emissions, which helps to determine the effect of the vehicle's emissions on air pollution.

SUMMARY

An emission monitoring device is disclosed for a vehicle including but not limited to a lightweight housing for operationally encapsulating: a processor; a computer program including but not limited to computer readable instructions embedded in a tangible non-transitory computer readable medium; a sensor for each vehicle component to be monitored; a display device; and a power supply for power the device; the computer program including but not limited to instructions to analyze fuel being injected into the vehicle from data output from each sensor; capture data from each sensor; store the captured data from each sensor into the memory; calculate performance attributes based upon the captured data; store the performance attributes; and display the performance attributes of each vehicle component onto the display device. A method is provided for monitoring emissions using the emission monitoring device. In other embodiments the vehicle may include but is not limited to a car, truck or sea/water going vessel. In other embodiments the vehicle may include but is not limited to any form of transportation in air, land and sea. In other embodiments the vehicle may include but is not limited to tractors, heavy equipment and lawn mowers or other small engines devices. In other embodiments the vehicle may include but is not limited to refinery production units that run off of fuel sources.

DETAILED DESCRIPTION

An emission monitoring device is disclosed for a vehicle including but not limited to a lightweight housing for operationally encapsulating: a processor; a computer program including but not limited to computer readable instructions embedded in a tangible non-transitory computer readable medium; a sensor for each vehicle component to be monitored; a display device; and a power supply for power the device; the computer program including but not limited to instructions to analyze fuel being injected into the vehicle from data output from each sensor; capture data from each sensor; store, the captured data from each sensor into the memory; calculate performance attributes based upon the captured data; store the performance attributes; and display the performance attributes of each vehicle component onto the display device; and the housing being operationally mounted onto the inner gas lid of the vehicle. In another embodiment of the device, at least one of the sensors is a spectral analyzer, the computer program further including but not limited to instructions to analyze data from the spectral analyzer to determine the fractional component parts of the fuel being injected into the vehicle.

In another embodiment of the device, computer program further including but not limited to instructions to analyze data from the spectral analyzer to determine the source of the fuel being injected into the vehicle. In another embodiment, at least one of the sensors is a flow meter, the computer program further including but not limited to instructions to analyze data from the flow meter to determine the quantity of fuel being injected into the vehicle. In another embodiment of the device, the device further includes but is not limited to a first hand-held output device having a processor and a display indicator for each vehicle component to be displayed; the processor being programmed to: retrieve from memory the performance attributes for each vehicle component to be display; and display the performance attribute onto the display indicator, whereby a user can determine the status of the vehicle component from the indicator; and the output device being operationally connected to the communication interface.

In another embodiment of the device, the device further includes but is not limited to a second hand-held output device having a processor and a display indicator for the vehicle emission; and the processor being programmed to:

retrieve from memory the performance attributes for the vehicle emission; and display the performance attribute onto the display indicator, whereby an operator can determine the whether the car pass status of the vehicle component from the indicator; and the output device being operationally connected to the communication interface. In another embodiment of the device, the device further includes but is not limited to a storage device operationally connected to the communication interface for transferring from memory stored performance attributes and/or captured data for monitored vehicle components.

In another embodiment, a method for monitoring emissions for a vehicle including but not limited to immersing at least one sensor in fuel being injected into a vehicle a sensor for each vehicle component to be monitored; analyzing the fuel being injected into the vehicle from data output from the at least one sensor; capturing data from the at least one each sensor; storing the captured data from each sensor into the memory; calculating performance attributes based upon the captured data; storing the performance attributes; and displaying the performance attributes of each vehicle component onto the display device; and the housing being operationally mounted onto the inner gas lid of the vehicle.

In another embodiment of the method, the method further includes but is not limited to at least one of the sensors is a spectral analyzer, the method further including but not limited to analyzing data from the spectral analyzer to determine the fractional component parts of the fuel being injected into the vehicle. In another embodiment of the method, the method further includes but is not limited to analyzing data from the spectral analyzer to determine the source of the fuel being injected into the vehicle. In another embodiment of the method, the method further includes but is not limited to analyzing data from the flow meter to determine the quantity of fuel being injected into the vehicle.

In another embodiment of the method, the method further includes but is not limited to retrieving from memory the performance attributes for each vehicle component to be display; and displaying the performance attribute onto the display indicator. In another embodiment of the method, the method further includes but is not limited to retrieving from memory the performance attributes for the vehicle emission; and displaying the performance attribute onto the display indicator, whereby an operator can determine the whether the car pass status of the vehicle component from the indicator. In another embodiment of the method, the method further includes but is not limited to transferring from memory stored performance attributes and/or captured data for monitored vehicle components.

Figure 1:
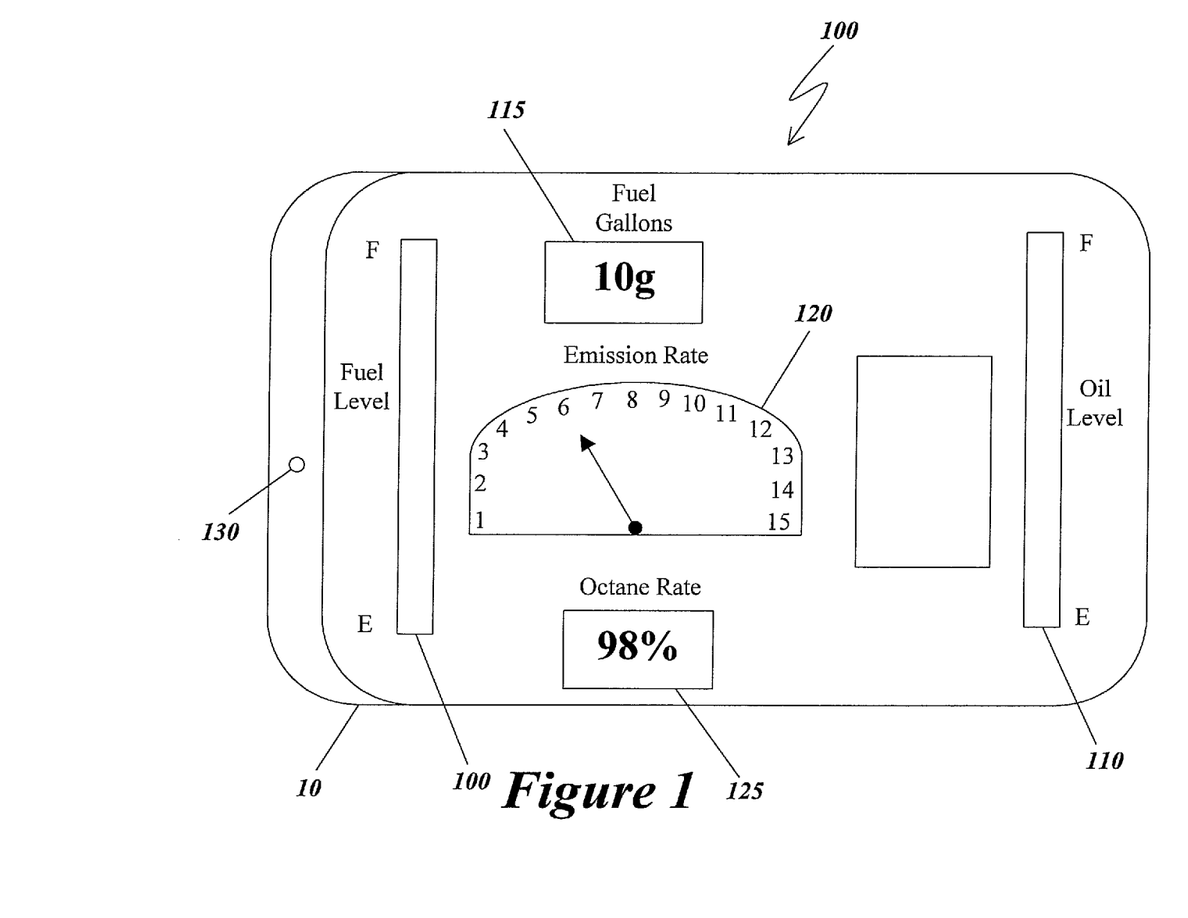
FIG. 1 is a schematic depiction of an illustrative embodiment of a sample display of the present invention.

Referring to FIG. 1, there is shown an illustration of one embodiment of the present invention, an emission monitoring display system 10. As shown, the device can display the following: Exact fuel level 100 exact oil level 110 exact number of gallons 115 octane rate of gasoline 125 Exact emission rate 120 Interface Port 130

In a particular embodiment of the present invention, device 10 is dimensioned to be mounted inside the gas lid of the vehicle. In other embodiments, device 10 can be mounted within a vehicle's dashboard. The entire unit is lightweight and weighs between 5 and 8 ounces.

This embodiment includes but is not limited to an input device for entering data into the system through port 130. The input device can be a touch screen, a voice activated mechanism, and a keyboard input device or another such compatible input device. The display device 10 can be an LCD, an OLED or another such compatible flat or flexible display device.

Figure 1A:
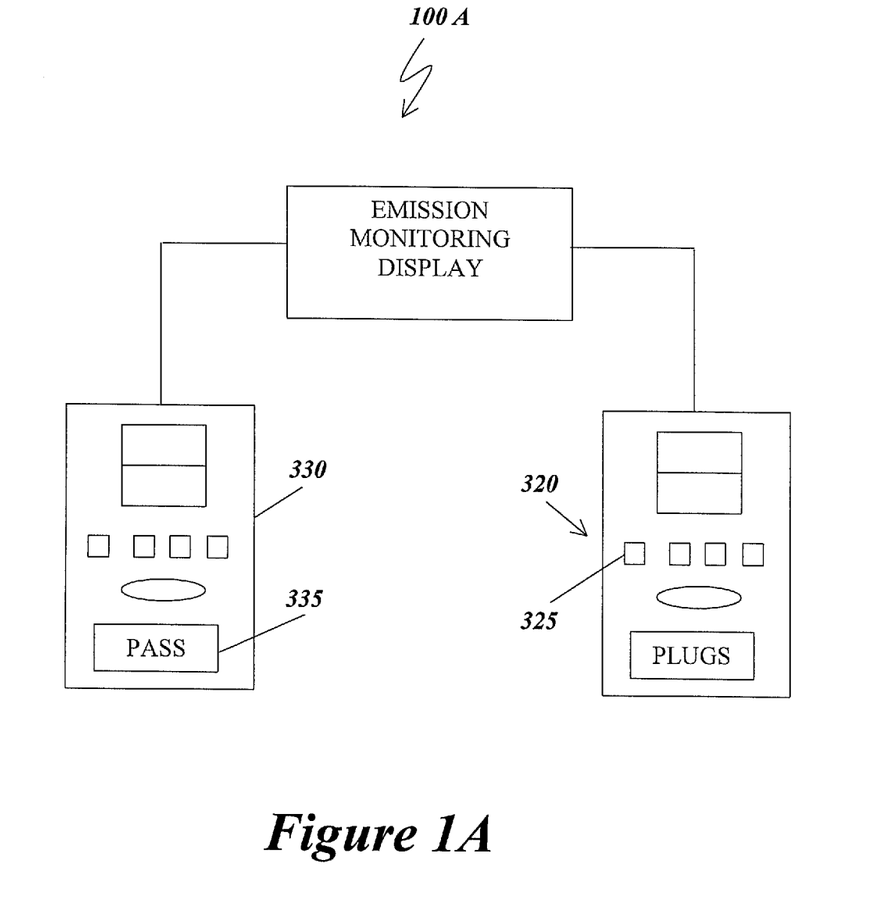
FIG. 1A is a schematic depiction of an illustrative embodiment of a first and second hand-held devices.

As shown in FIG. 1A, the system can include a first hand-held device 320 for the consumer or an automotive repair shop. The first hand-held output device 320 would have a display which indicates the status of several of the sensor leads as described below. For example, if the spark plugs need to be replaced then the device would indicate it through indicator lights 325. In operation, the first hand-held output device 320 would be operationally connected to input port 130 via a hard-wire or a wireless connection.

As shown in FIG. 1A, the system can include a second hand-held device 330 for the law enforcement official. The second hand-held output device 330 would have a display 335 which indicates the status of the emission of the vehicle. For example, the display 335 would indicate pass or fail. Display 335 can be implemented in a color bar or grid. Green can mean pass, yellow can be caution, and red can means fail. In operation, the second hand-held output device 330 would be operationally connected to input port 130 via a hard-wire or a wireless connection.

Figure 2:
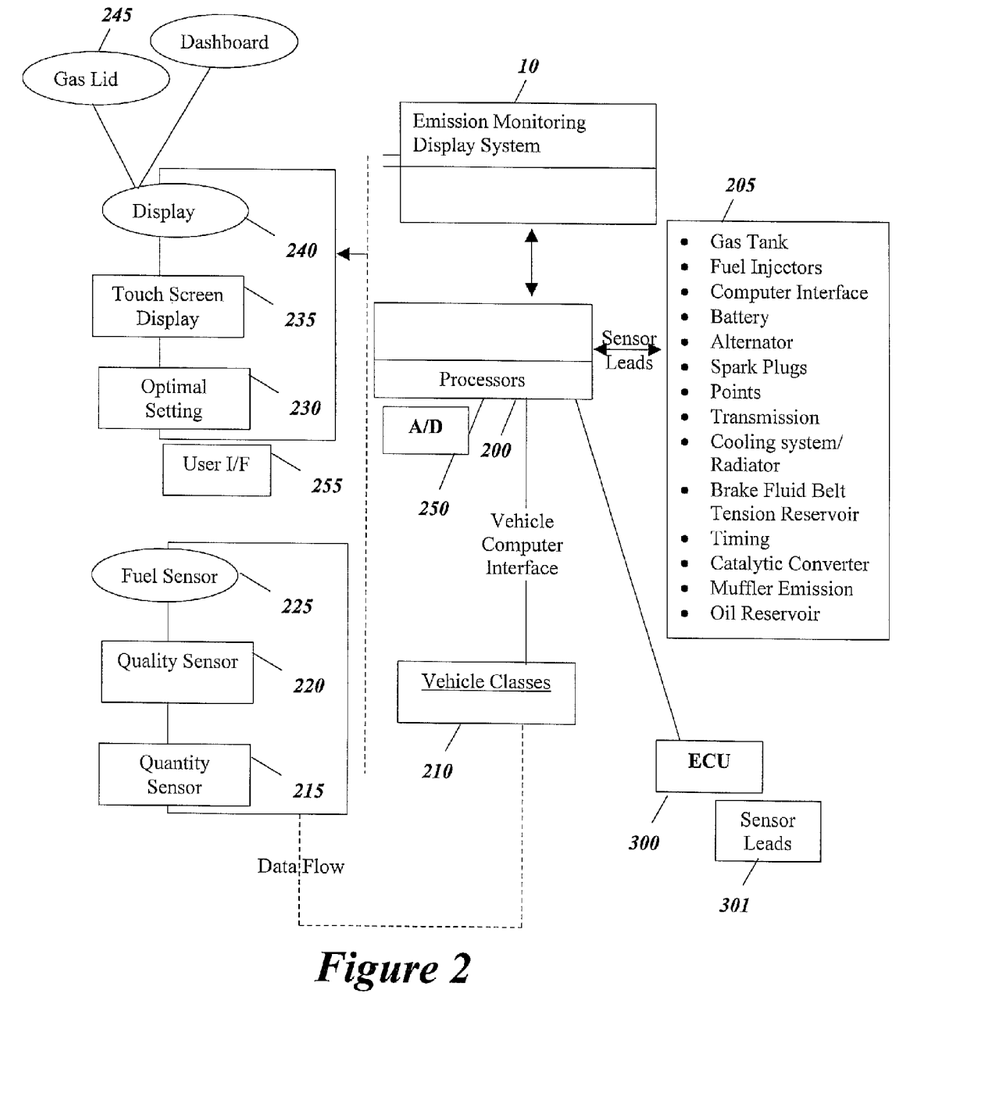
FIG. 2 is a schematic depiction of an illustrative embodiment of an operational diagram of the present invention.

Referring to FIG. 2, there is shown an operational block diagram of device 10. The system includes micro-processor 200 connected to a plurality of sensor leads 205. An analog to digital converter (A/D) can be utilized to read analog signals from sensor leads that emit analog signals. The A/D would convert the signals from the sensor leads into digital streams that the microprocessor can read.

The sensor leads can be R/F/A Gallium Sensors or another such compatible sensor lead. In this embodiment, the sensor leads 205 receive information from various vehicle fluid and mechanical components including but not limited to: Oil Reservoir; Points; Muffler Emission; Transmission Gas Tank; Cooling System; Fuel Injectors; Radiator Computer Interface; Catalytic Converter Battery; Brake Fluid; Alternator Reservoir; Spark Plugs; Belt Tension; and Timing.

A software program is provided that includes but is not limited to vehicle classes 210 which define the data to be stored and the operations to be performed by the software modules that monitor the vehicle fluid and mechanical components. A vehicle object will have to be defined for each type of vehicle to be monitored. The data stored in the objects includes representation of the data received from the sensor leads defined above. The information received includes fuel 225, quality 220 and quantity 215 related sensor data. The sensor leads can report two states (active and dynamic). An active state attributes involve the recording of exposure to negative environments such as wet, dry, heat or vibrations. The dynamic state attributes involve the recording of enhanced performance data.

Additionally, the processor can be interfaced with the existing computer 300 of the vehicle and where applicable provide a check and balance against the data being analyzed by the system of the present invention. The vehicle computer can also be attached to several leads 305 which provide the data which vehicle computer 300. User interface software 255 is required to allow the user to setup the device to monitor the vehicle and to the control the monitoring process. In some embodiments, the user interface can be adapted to execute through a separate input device connected to port 130. In other embodiments, user interface software 255 can be setup to execute through a touch screen input device which is operationally incorporated into display 240.

In use, the user via an operational setup screen 235 through the User Interface Software 255 defines the control settings to monitor the air quality of the vehicle through the sensor leads, initiating the system to monitor the vehicle. The setup screen 235 can be a touch screen input device. The processor 200 can periodically poll the sensor leads for information and store the data in the vehicle objects 210. Significant event information can be sent to the processor 200 from the sensor leads 205. Additionally, the dynamic state attributes can allow users from the touch tone to initiate the display of real time data. After information has been transmitted to the processor, the received sensor information is stored in memory for display onto the dashboard 246 or on the gas lid 245.

Figure 3:
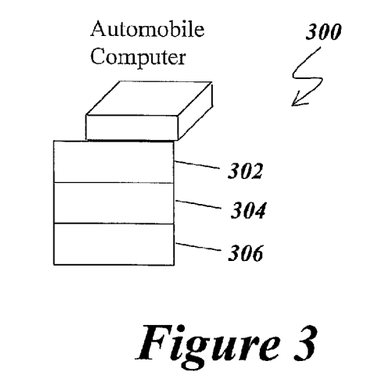
FIG. 3 is a schematic depiction of an illustrative embodiment of a display and input panel.

Turning now to FIG. 3, in a particular illustrative embodiment, a processor 302, memory 304 and database 306 are provided. Software and computer programs including but not limited to computer executable instructions embedded in memory such as a tangible non-transitory computer readable storage medium. The data base contains data embedded in the tangible non-transitory computer readable storage medium used by the processor in monitoring emissions.

Figure 4:
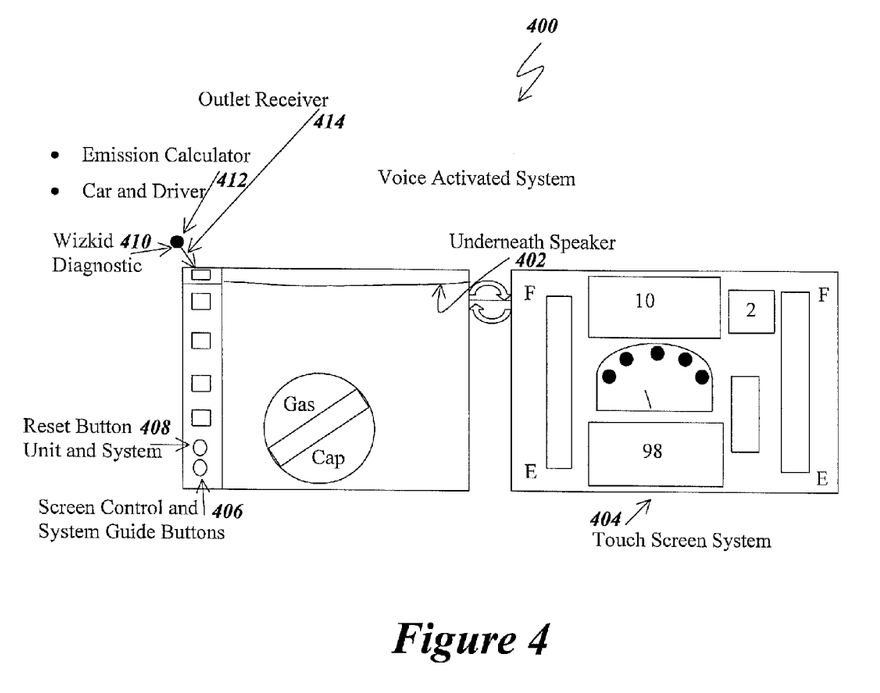
FIG. 4 is a schematic depiction of an illustrative embodiment of an emission monitoring display device and system.

Turning now to FIG. 4, as shown in FIG. 4, in an illustrative embodiment 400 a voice activated emission monitoring display device and system is depicted. In a particular illustrative embodiment, a substantial portion of the voice activated emission monitoring and display device are mounted inside of a gas refueling cavity of a vehicle adjacent a gas cap and under a gas refueling cavity cover door. A transponder 402 is provided to accept voice input commands and announce audible responses to the input voice commands. A touch screen is provided for textual input and display for use in lieu of the voice activation and announcement from the transponder. Screen control and guide buttons 406 are provided to controller the processor and software associated with the emission monitoring device as described herein. A diagnostic device is provided for storing diagnostic results that can extracted from the diagnostic device by removing the diagnostic device from the system and reading the data on a separate computer. In another embodiment, the diagnostic device data is transferred wirelessly via outlet receiver and transmitter 414.

Figure 5:
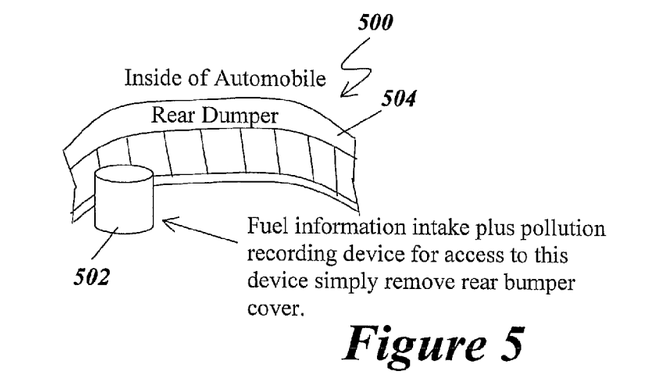
FIG. 5 is a schematic depiction of an illustrative embodiment of a fuel information intake and pollution recording device.
Figure 6:
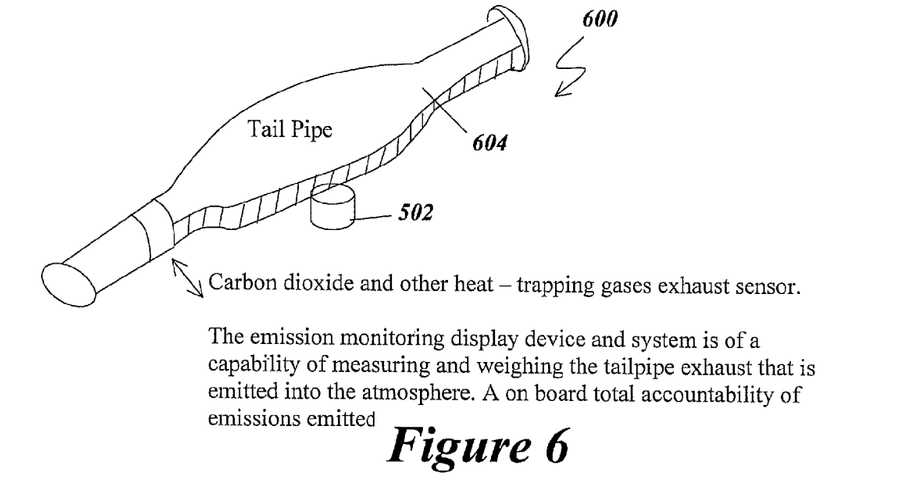
FIG. 6 is a schematic depiction of an illustrative embodiment of a carbon dioxide and other heat trapping exhaust sensor device.

Turning now to FIG. 5, in a particular illustrative embodiment, a fuel information intake and pollution recording device 502 is provided and mounted inside of an automobile rear bumper 504. 502 is provided and mounted inside of an automobile rear bumper 504. Turning now to FIG. 6, in a particular illustrative embodiment 600, a carbon dioxide and other heat trapping exhaust sensor device 602 is provided and mounted on an automobile exhaust pipe 604. Data from all sensors described herein are wirelessly transmitted to the emission monitoring system processor for analysis and display.

Figure 7:
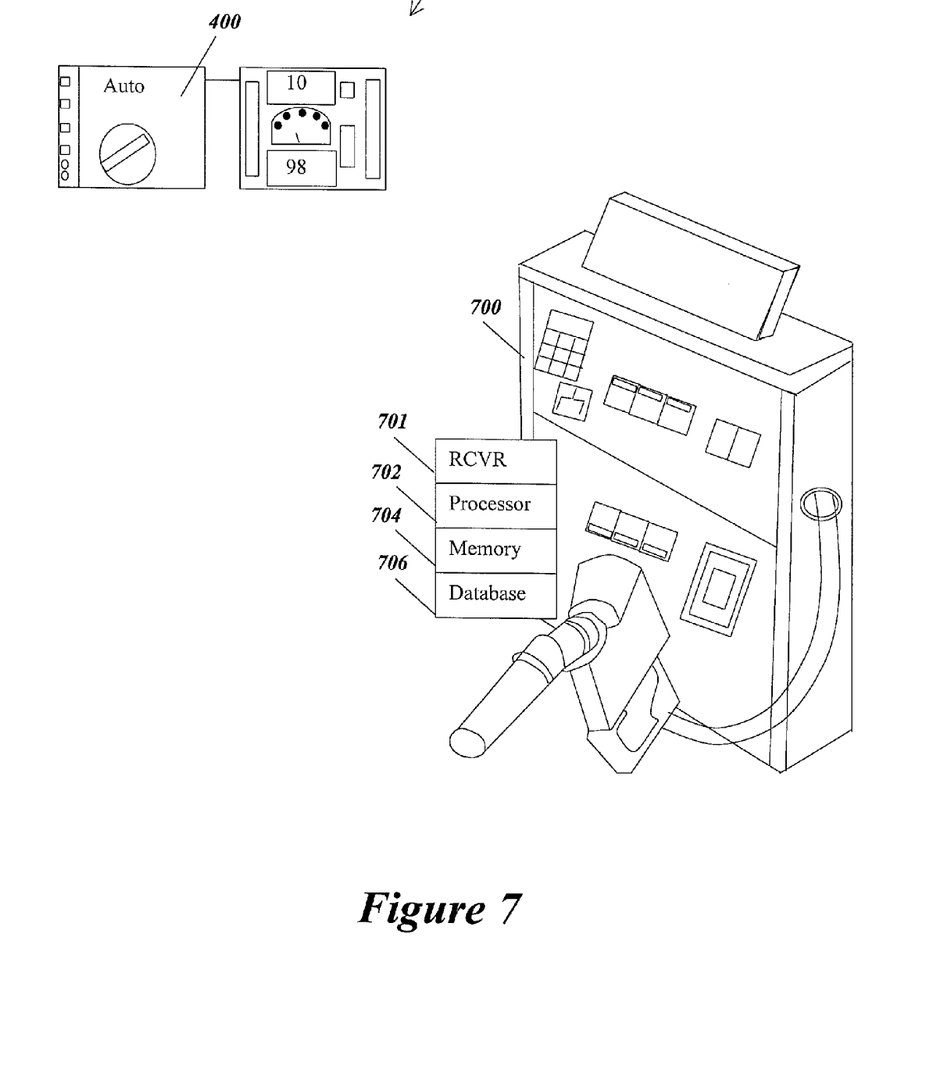
FIG. 7 is a schematic depiction of an illustrative embodiment of an automobile emission monitoring system and gas pump processor exchange data to agree on a fueling transaction that is to occur between them.

Turning now to FIG. 7, in another particular embodiment, the automobile emission monitoring system 400 and gas pump processor 702 exchange data to agree on a fueling purchase that is to occur between them. The emission monitoring system and processor agree on the type of fuel, octane grade level, a second measurement of gallons actually injected into the automobile gas tank, the price of the fuel and the identity of the fuel source.

Figure 8:
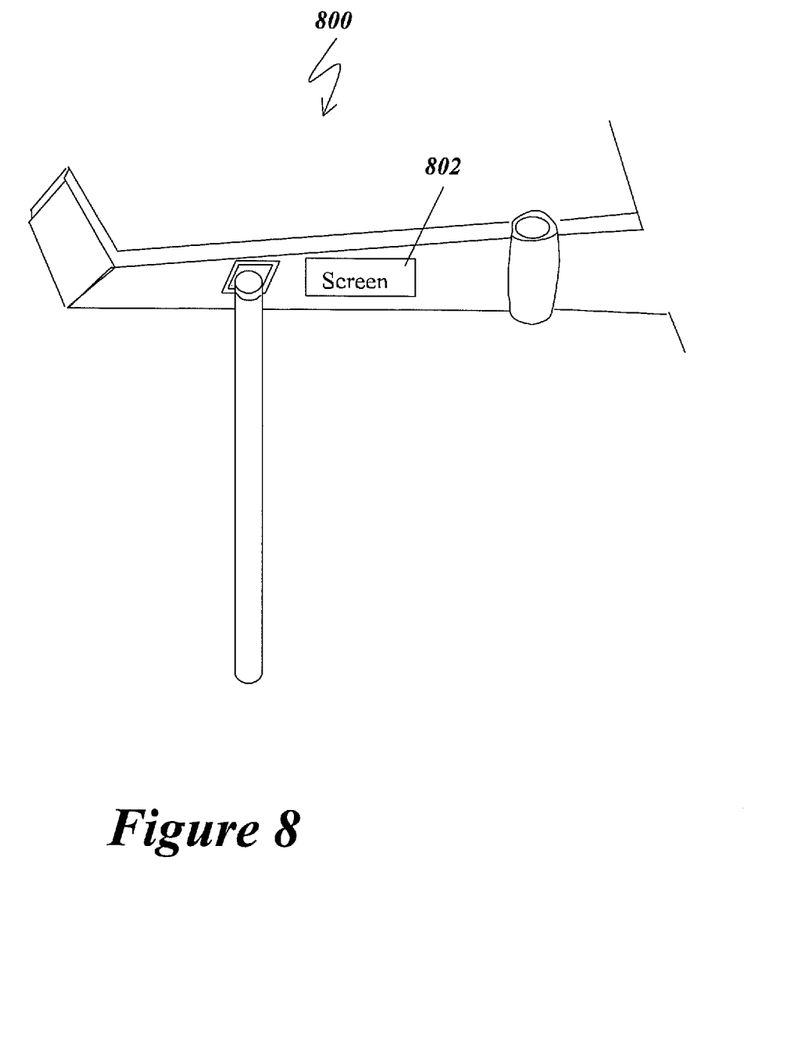
FIG. 8 is a schematic depiction of an illustrative embodiment of a display screen that displays a fuel content analysis performed by a sensor.

Turning now to FIG. 8, as shown in FIG. 8 a trained and certified fuel technician can read a display screen 802 in an illustrative embodiment which displays a fuel content analysis performed by the a sensor placed in the throat of the gas tank fill spot under the gas cap so that the sensor is immersed in the gasoline mixture as it enters the gas tank. The sensor can perform spectral analysis on the gas entering the gas tank to determine the fractional content of the composite ingredients in the gasoline mixture entering the gas tank. The spectral analysis can also be used to determine the source of a gasoline mixture when compared to a data base of spectral signature for source gasoline. Thus, not only the brand such as the name of the gas station is identified, but also the source of the gasoline is also identified. Source spectral fingerprints are stored in a data base and used to compare to the gasoline mixture entering the gas tank to identify the source.

Figure 9:
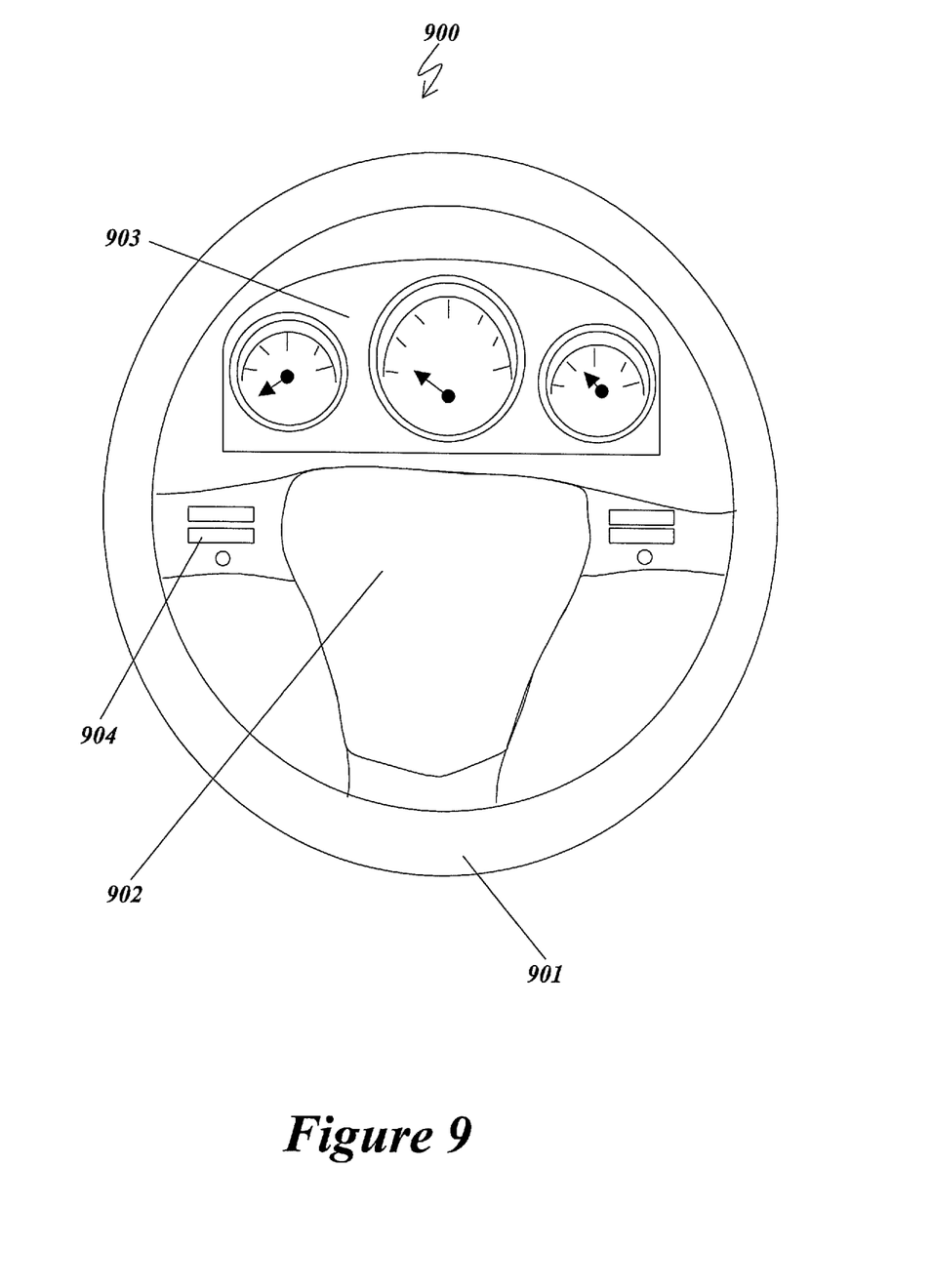
FIG. 9 is a schematic depiction of an illustrative embodiment of an emission monitoring system out put data display 903 is visible through a steering wheel.

Turning now to FIG. 9, in another particular embodiment, an emission monitoring system out put data display 903 is visible through a steering wheel 901 and system input data buttons 904 are placed on a steering wheel. The input data buttons allow data input for control of the emission monitoring system. In another embodiment, an emission monitoring system output data display 902 is positioned on steering wheel 901.

Figure 10:
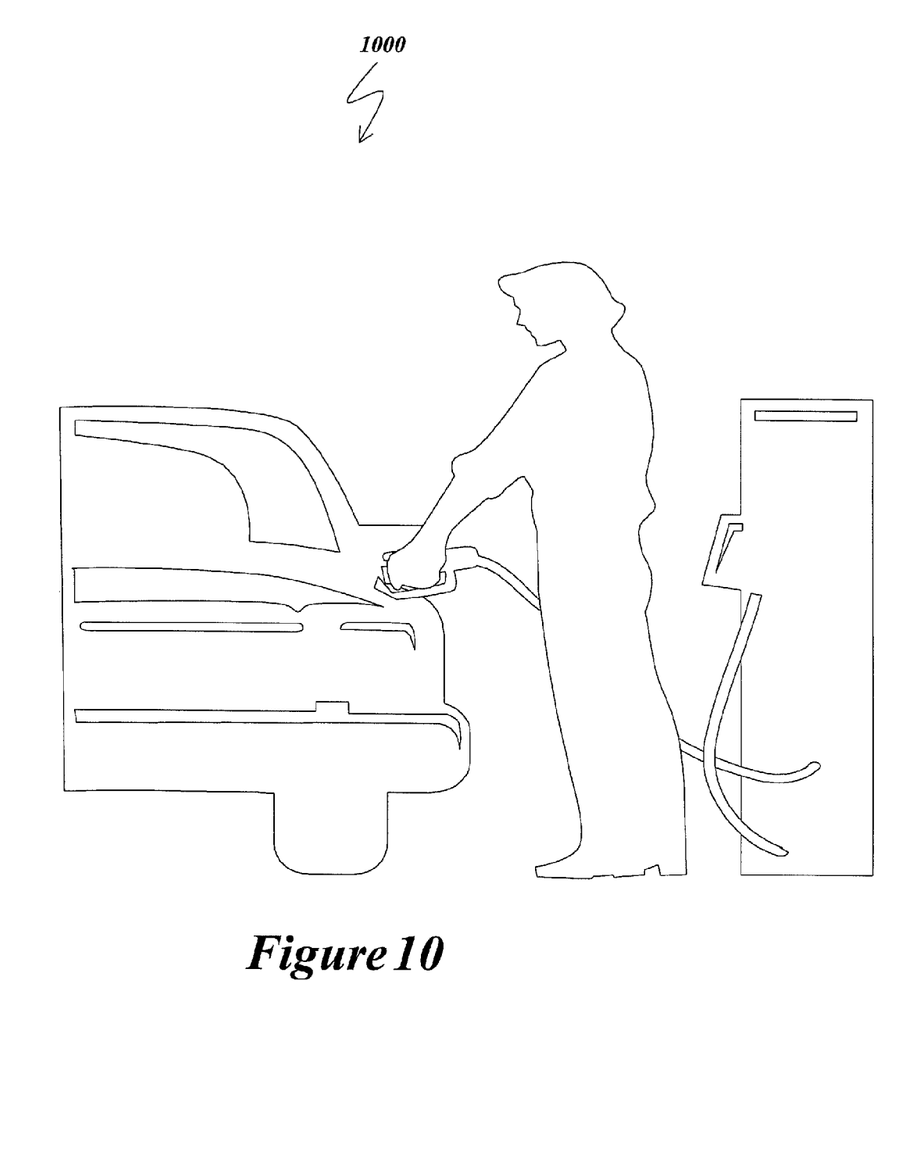
FIG. 10 is a schematic depiction of an illustrative embodiment wherein emission monitoring system provides an independent measure of the quantity and quality of the fuel emission monitoring system provides an independent measure of the quantity and quality of the fuel.

Turning now to FIG. 10, in a particular embodiment, a consumer monitors the gas pump at a filling station to indicate the quality and great of the fuel being purchased as wheel as the purchase price. The emission monitoring system provides an independent measure of the quantity and quality of the fuel for comparison. The independent emission monitoring system data indicates if the fuel being purchased contains sludge or water or other unwanted contaminants.

While the foregoing disclosure is directed to the exemplary embodiments of the invention, various modifications will be apparent to those skilled in the art. It is intended that all variations within the scope of the appended claims be embraced by the foregoing disclosure.

What is claimed is:

1. An emission monitoring device for a vehicle comprising: a lightweight housing for operationally encapsulating: a processor; a computer program comprising computer readable instructions embedded in a tangible non-transitory computer readable medium; a sensor for each vehicle component to be monitored; a display device; and a power supply for power the device; the computer program comprising instructions when executed by the processor to analyze fuel being injected into the vehicle from data output from each sensor; capture data from each sensor; store the captured data from each sensor into the memory; calculate performance attributes based upon the captured data; store the performance attributes; and display the performance attributes of each vehicle component onto the display device; at least one of the sensors is a spectral analyzer, the computer program further comprising instructions to analyze data from the spectral analyzer to determine the fractional component parts of the fuel being injected into the vehicle and the housing being operationally mounted onto the inner gas lid of the vehicle.

2. The device of claim 1, the computer program further comprising instructions to analyze data from the spectral analyzer to determine the source of the fuel being injected into the vehicle.

3. The device of claim 1 wherein at least one of the sensors is a flow meter, the computer program further comprising instructions to analyze data from the flow meter to determine the quantity of fuel being injected into the vehicle.

4. The device of claim 3 further comprising: a first hand-held output device having a processor and a display indicator for each vehicle component to be displayed; the processor being programmed to: retrieve from memory the performance attributes for each vehicle component to be display; and display the performance attribute onto the display indicator, whereby a user can determine the status of the vehicle component from the indicator; and the output device being operationally connected to the communication interface.

5. The device of claim 3 further comprising: a second hand-held output device having a processor and a display indicator for the vehicle emission; and the processor being programmed to: retrieve from memory the performance attributes for the vehicle emission; and display the performance attribute onto the display indicator, whereby an operator can determine the whether the car pass status of the vehicle component from the indicator; and the output device being operationally connected to the communication interface.

6. The device of claim 3 further comprising a storage device operationally connected to the communication interface for transferring from memory stored performance attributes and/or captured data for monitored vehicle components.

7. A method for monitoring emissions for a vehicle comprising: immersing at least one sensor in fuel being injected into a vehicle a sensor for each vehicle component to be monitored; analyzing the fuel being injected into the vehicle from data output from the at least one sensor; capturing data from the at least one each sensor; storing the captured data from each sensor into the memory; calculating performance attributes based upon the captured data; storing the performance attributes; and displaying the performance attributes of each vehicle component onto the display device; and the housing being operationally mounted onto the inner gas lid of the vehicle.

8. The method of claim 7, wherein at least one of the sensors is a spectral analyzer, the method further comprising: analyzing data from the spectral analyzer to determine the fractional component parts of the fuel being injected into the vehicle.

9. The method of claim 8, further comprising: analyzing data from the spectral analyzer to determine the source of the fuel being injected into the vehicle.

10. The method of claim 7 wherein at least one of the sensors is a flow meter, the method further comprising: analyzing data from the flow meter to determine the quantity of fuel being injected into the vehicle.

11. The method of claim 10 further comprising: retrieving from memory the performance attributes for each vehicle component to be display; and displaying the performance attribute onto the display indicator.

12. The method of claim 10 further comprising: retrieving from memory the performance attributes for the vehicle emission; and displaying the performance attribute onto the display indicator, whereby an operator can determine the whether the car pass status of the vehicle component from the indicator.

13. The method of claim 10 further comprising: transferring from memory stored performance attributes and/or captured data for monitored vehicle components.

* * * * *